J. N. AUGE, Jr.
COMBINATION TRUCK AND WAGON DUMP.
APPLICATION FILED AUG. 19, 1918.
1,283,032.
Patented Oct. 29, 1918.
2 SHEETS—SHEET 1.
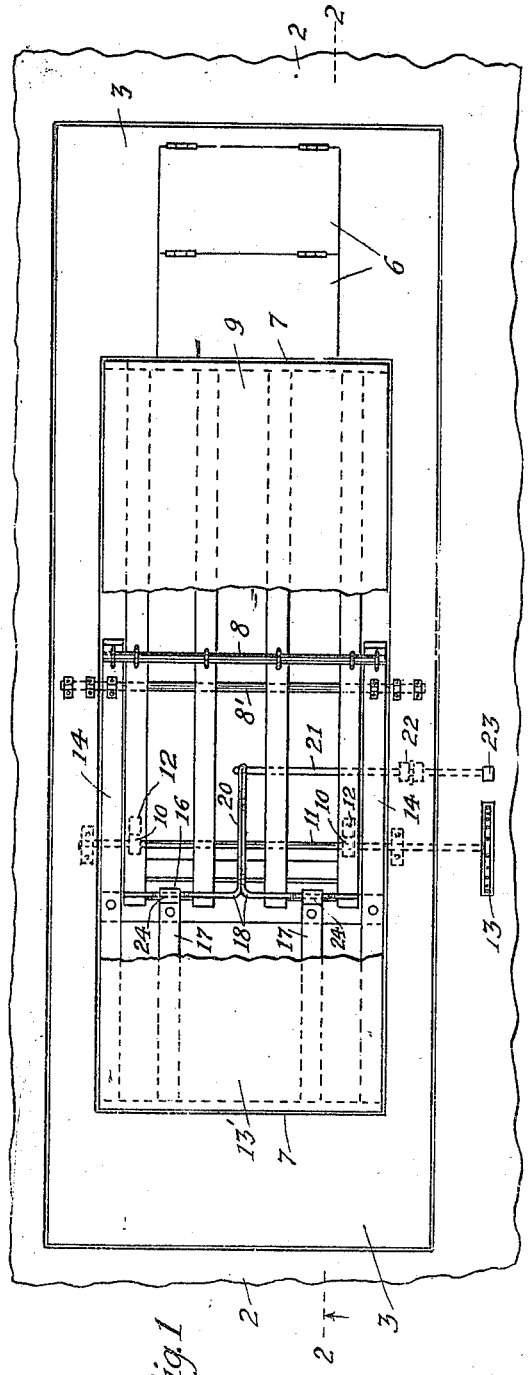
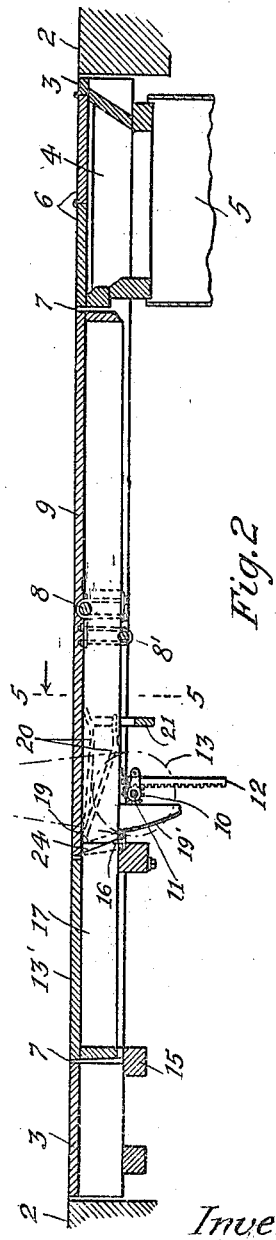
Inventor:
Joseph N. Auge, Jr.
By Paul & Paul
his Attorneys.

J. N. AUGE, Jr.
COMBINATION TRUCK AND WAGON DUMP.
APPLICATION FILED AUG. 19, 1918.

1,283,032.

Patented Oct. 29, 1918.

Inventor:
Joseph N. Auge, Jr.
By Paul & Paul
his Attorneys.

UNITED STATES PATENT OFFICE.

JOSEPH N. AUGE, JR., OF ST. PAUL, MINNESOTA, ASSIGNOR TO FAIRBANKS, MORSE & CO., OF ST. PAUL, MINNESOTA, A CORPORATION.

COMBINATION TRUCK AND WAGON DUMP.

1,283,032.          Specification of Letters Patent.      Patented Oct. 29, 1918.

Application filed August 19, 1918. Serial No. 250,572.

*To all whom it may concern:*

Be it known that I, JOSEPH N. AUGE, Jr., a citizen of the United States, resident of St. Paul, county of Ramsey, State of Minnesota, have invented certain new and useful Improvements in Combination Truck and Wagon Dumps, of which the following is a specification.

My invention relates to a dumping platform for grain elevators or warehouses and the object of the invention is to provide a single platform adapted for dumping either a horse drawn wagon or a motor driven truck. Before the general use of trucks, grain was hauled to the elevators or warehouses in wagons which were driven upon the dumping platform and the wagon tilted to discharge its contents into a hopper or other receptacle, the horses meanwhile standing upon a stationary portion of the platform while a tilting section thereof was operated to raise the forward end of the wagon and depress the rear end until its load was discharged. With the advent of the motor driven truck it was found that the ordinary wagon dump was too short for the wheel base of the truck and a platform of sufficient length for the truck could not be very well used for the wagon, as it would necessitate removing the team from the wagon before the platform was tilted. To provide a platform suitable for both a wagon and truck with a single tilting mechanism for both is the primary object, therefore, of my invention.

A further and particular object of my invention is to improve the apparatus shown and described in my allowed application of the United States, filed March 30, 1918, Serial No. 225,653.

The invention consists generally in various constructions and combinations, all as hereinafter described and particularly pointed out in the claims.

In the accompanying drawings forming part of this specification,

Figure 1 is a plan view of a dumping platform embodying my invention,

Fig. 2 is a sectional view on the line 2—2 of Fig. 1,

The invention is shown, as usual in devices of this kind, in connection with a weighing scale platform, and 2 represents the approaches to the platform at each end and 3 the scale platform, the scale levers under the platform being omitted, as they form no part of my present invention.

Figure 3:
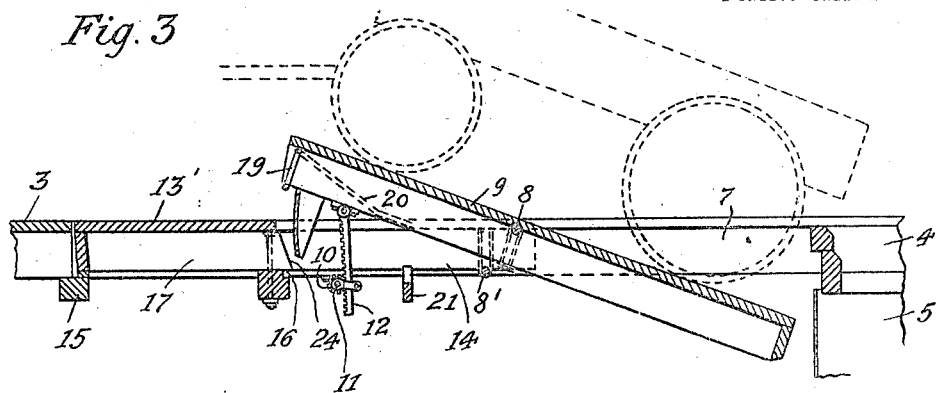
Fig. 3 is a sectional view showing the wagon dumping section of the platform in its tilted position.
Figure 4:
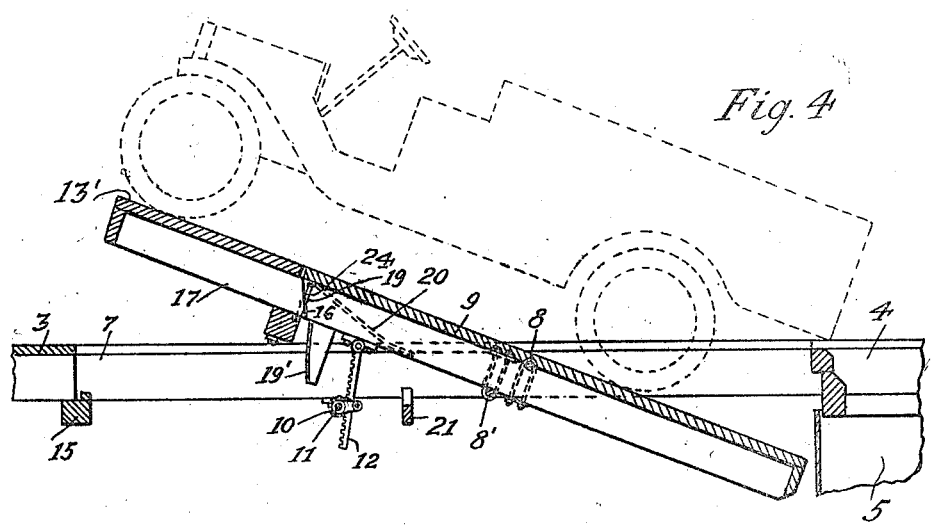
Fig. 4 is a similar view, showing the platform adapted for tilting a truck.
Figure 5:
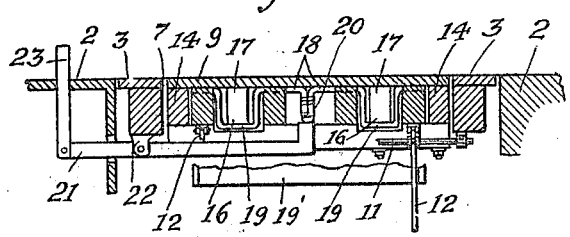
Fig. 5 is a sectional view on the line 5—5 of Fig. 2.

4 is a hopper at one end of the scale platform having its lower end vertically movable in a spout 5 through which the grain is conducted to a suitable bin, not shown. The hopper is provided preferably with a sectional cover 6 by means of which the opening thereto is closed and concealed. The scale platform is provided with a rectangular opening 7. A shaft 8 is journaled in the scale platform transversely of this opening and a wagon dumping platform 9 is centrally mounted on said shaft and normally is flush with the floor of the scale platform but may be tilted in the opening 7 to discharge the wagon on the platform of its load into the hopper 4. Any suitable mechanism may be provided for tilting this wagon dumping platform, but I have shown a conventional means, consisting of pinions 10 mounted on a shaft 11 and engaging racks 12 secured to the underside of the platform. When the shaft 11 is revolved by suitable means, such as the wheel 13, the dumping platform will be tilted to discharge its load, as shown in Fig. 3, or returned to its horizontal position, as indicated in Fig. 2. At one end of the wagon dumping platform I provide an extension 13' having rails 14 mounted on an independent shaft 8' and normally flush with the top of the scale platform and the wagon dumping platform. The outer end of the extension 13 contacts with a suitable transverse stop 15 which projects into the opening 7 and limits downward movement of said extension.

As shown in the drawing, the principal point of difference in this case over my former application lies in providing an independent shaft for a wagon dumping platform and for the truck platform. I have found that where one shaft common to both platforms is used, it sometimes happens that the truck platform or body of the truck, being longer than a wagon, will not allow the truck to tilt to the desired angle for dumping without bringing the rear wheels of the truck too near the shaft on which the platform is mounted. The objection to this, of course, is that it brings the load on one end of the platform instead of having it distributed on both ends and thereby balancing the platform and making it easier of operation. I have found upon installing the apparatus that by arranging the shafts as shown in the drawings, the truck can be more easily tilted to the desired angle and a more substantial dumping platform obtained than where both platforms are mounted on the same shaft.

To provide for simultaneous movement of the platforms, when the device is used for dumping a truck, I prefer to provide shoulders 16 on bars 17 mounted to lap by the adjacent end of the wagon platform, and a rock shaft 18 has bails 19 formed thereon for engaging the said shoulders 16 and temporarily locking the two platforms together for simultaneous movement. An operating arm 20 is formed on the shaft 18 and a lever 21 is pivoted at 22 on the scale platform and has a treadle 23 vertically movable near said platform by means of which the lever 21 may be rocked to oscillate the shaft 18 and disengage the wagon dumping platform from the truck extension and thereby allow the wagon dump to be operated independently of the truck. When the two platforms are locked together, as indicated in Fig. 2, they will be tilted simultaneously and the apparatus is then adapted for handling a loaded truck. If the next load to be dumped should be a team-drawn wagon, the platform locking device will be tripped to allow the wagon dump to be operated independently.

The ends of the bars 17 are preferably beveled, as shown at 24, for contact with the bails 19 when the wagon platform is returning to its normal horizontal position, so that the two platforms will be automatically locked together when horizontal. If a truck is to be admitted first, then the locking device remains in its normal position but if a wagon is to be dumped, the locking device is tripped and the wagon platform may then be tilted independently. A sheet metal guard 19' is preferably provided at one end of the wagon dump.

Any other suitable means may be provided for temporarily locking the two platforms together and I may modify in various ways the means for operating the two platforms.

I claim as my invention:

1. The combination, with a scale platform having an opening therein, of a shaft mounted transversely of said opening, a wagon dumping platform mounted on said shaft, a second shaft mounted transversely of said opening near said first named shaft, a truck extension of said platform mounted on said second shaft, and means for temporarily locking said wagon platform and said truck extension together for simultaneous movement or releasing them for independent movement of said wagon platform.

2. A combined truck and wagon dump platform comprising a tilting section, a truck extension therefor, said tilting section and said truck extension having independent pivotal supports, means for temporarily uniting said tilting section and said extension for simultaneous movement on the pivots of said truck extension to dump a truck or releasing said tilting section for independent movement on its pivots to dump a wagon.

In witness whereof I have hereunto set my hand this 10th day of August, 1918.

JOSEPH N. AUGE, Jr.